United States Patent
Kuga et al.

(10) Patent No.: US 8,641,400 B2
(45) Date of Patent: Feb. 4, 2014

(54) MOLD CLAMPING APPARATUS

(75) Inventors: Kazunori Kuga, Aichi (JP); Takashi Mizuno, Aichi (JP); Toshihiko Kariya, Aichi (JP); Nobuhiro Uchida, Aichi (JP); Koji Suzuki, Aichi (JP)

(73) Assignees: Mitsubishi Heavy Industries Plastic Technology Co., Ltd., Nagoya-shi, Aichi (JP); Mitsubishi Heavy Industries, Ltd., Tokyo (JP)

( * ) Notice: Subject to any disclaimer, the term of this patent is extended or adjusted under 35 U.S.C. 154(b) by 342 days.

(21) Appl. No.: 12/934,188

(22) PCT Filed: Mar. 17, 2009

(86) PCT No.: PCT/JP2009/001192
§ 371 (c)(1),
(2), (4) Date: Oct. 29, 2010

(87) PCT Pub. No.: WO2010/052803
PCT Pub. Date: May 14, 2010

(65) Prior Publication Data
US 2011/0052742 A1  Mar. 3, 2011

(30) Foreign Application Priority Data
Nov. 5, 2008 (JP) .................... 2008-284142

(51) Int. Cl.
*B29C 45/67* (2006.01)
(52) U.S. Cl.
USPC .......................... 425/149; 264/40.5
(58) Field of Classification Search
USPC .......................... 425/149, 150; 264/40.1, 40.5
See application file for complete search history.

(56) References Cited

U.S. PATENT DOCUMENTS

| | | | |
|---|---|---|---|
| 3,761,219 A | 9/1973 | Flynn et al. | |
| 7,001,545 B2 * | 2/2006 | Okado et al. | 425/149 |
| 7,287,972 B2 * | 10/2007 | Tsuji et al. | 425/149 |
| 2004/0105912 A1 | 6/2004 | Koda | |
| 2005/0226958 A1 | 10/2005 | Tsuji et al. | |
| 2008/0206382 A1 * | 8/2008 | Yokoyama et al. | 425/149 |
| 2009/0117220 A1 * | 5/2009 | Bazzo et al. | 425/149 |

FOREIGN PATENT DOCUMENTS

| | | |
|---|---|---|
| JP | 2005-324249 A | 11/2005 |
| JP | 2005-335072 A | 12/2005 |

OTHER PUBLICATIONS

International Search Report of PCT/JP2009/001192, mailing date Jun. 23, 2009.
Written Opinion of PCT/JP2009/001192, mailing date Jun. 23, 2009.
Chinese Office Action dated Nov. 5, 2012, issued in corresopnding Chinese Patent Application No. 200980111120.6, (10 pages). With English Translation.

* cited by examiner

*Primary Examiner* — James Mackey
(74) *Attorney, Agent, or Firm* — Westerman, Hattori, Daniel & Adrian, LLP

(57) ABSTRACT

There is provided a mold clamping apparatus that can prevent a molding material from spouting from a split surface of a mold even if in-cavity resin pressure causes offset of a mold opening force, and can extend the life of the mold. The mold clamping apparatus includes a control device that estimates a mold opening force by mold internal pressure for molding with mold internal pressure being asymmetrical with respect to a center of a mold block, determines a mold clamping hydraulic value applied to each tie bar correspondingly to the estimated mold opening force, and distributes hydraulic pressure supplied to each tie bar so that the determined mold clamping hydraulic value is reached.

9 Claims, 13 Drawing Sheets

Xg, Yg : COORDINATE OF THE CENTER OF GRAVITY OF MOLD OPENING FORCE
Pi : MOLD OPENING PRESSURE (RESIN PRESSURE) AT ARBITRARY POINT
A : MOLD OPENING PRESSURE AREA (MOLDED PRODUCT AREA)
Xg', Yg' : COORDINATE OF THE CENTER OF GRAVITY OF MOLD CLAMPING FORCE
F1 ~ F4 : MOLD CLAMPING FORCE OF EACH CYLINDER
α, β : DISTRIBUTION RATIO OF MOLD CLAMPING FORCE OF EACH CYLINDER

0 SEC AFTER INJECTION START

T1 SEC AFTER INJECTION START

T2 SEC AFTER INJECTION START

MOLD CLAMPING APPARATUS

TECHNICAL FIELD

The present invention relates to a mold clamping apparatus used for a molding machine such as an injection molding machine or a die casting machine.

BACKGROUND ART

A mold clamping apparatus used for a molding machine such as an injection molding machine or a die casting machine includes a stationary die plate that holds one of a pair of molds (stationary mold), and a movable die plate that holds the other (movable mold), and applies a force between the stationary die plate and the movable die plate in mold clamping to perform mold clamping of the pair of molds. A mold clamping force required for the mold clamping is applied by, for example, generating tension in a plurality of tie bars provided between the stationary die plate and the movable die plate.

Generally, the plurality of tie bars are placed symmetrically with respect to the center of the stationary die plate and the movable die plate so as to provide uniform distribution of the mold clamping force applied to the split surface of the mold, and each tie bar bears the same amount of load (tie bar load).

When the center of gravity of a molded product is offset from the center of the mold clamping apparatus, a force to open the mold (a force to separate the stationary mold from the movable mold) generated by pressure of a molding material applied in a cavity formed by the stationary mold and the movable mold acts on a position offset from the center of the mold clamping apparatus. Thus, if a uniform mold clamping force is applied when the center of gravity of the molded product is offset from the center of the mold clamping apparatus, a force applied to a split surface between the stationary mold and the movable mold on the side with the center of gravity of the molded product being offset becomes non-uniform, thereby creating a gap in the split surface and easily producing burrs.

To solve a problem that the molding material spouts from the split surface in a molding cycle, it is contemplated that loads on the plurality of tie bars are uniformly increased to increase the mold clamping force, but this method may apply an excessive load to the mold to reduce the life of the mold.

A mold clamping apparatus that can prevent a molding material from spouting from a split surface of a mold, and can extend the life of the mold is disclosed in Patent Document 1. The mold clamping apparatus includes a control device that determines a mold clamping force borne by each of a plurality of tie bars based on information on the mold, and independently controls oil pressure in a cylinder chamber of each mold clamping cylinder so as to obtain the determined mold clamping force.
Patent Document 1: Japanese Patent Laid-Open No. 2005-324249

DISCLOSURE OF THE INVENTION

Problems to be Solved by the Invention

With the mold clamping apparatus disclosed in Patent Document 1, the mold clamping force borne by each of the plurality of tie bars is independently adjusted based on information on the mold such as mold shape information or mounting position information, and distribution of pressure applied to a split surface of the mold becomes uniform, thereby preventing production of burrs.

Thus, flow pressure loss occurs in molten resin used in injection molding due to the influence of viscosity, and large distribution occurs without uniform resin pressure in a cavity. Thus, when an injection gate is not placed at the center of the cavity, or when the injection gate is placed at the center of the cavity but a cavity thickness varies in a complex manner and there is a thin portion with high flow pressure loss, distribution of pressure in the cavity (mold internal pressure) is also significantly offset. In this case, even if the mold clamping force by the plurality of tie bars is determined in view of mold information such as the position or strength of the mold, in-cavity resin pressure stronger than the mold clamping force causes offset of the mold opening force, thereby easily producing burrs due to spouting of resin. Further, with the mold clamping apparatus disclosed in Patent Document 1, each cylinder needs to include a hydraulic circuit that has the same configuration and can supply a large amount of oil, which causes problems of space and cost.

The present invention is achieved based on such technical problems, and has an object to provide a mold clamping apparatus that can prevent a molding material from spouting from a split surface of a mold even if in-cavity resin pressure causes offset of a mold opening force, and can extend the life of the mold.

Means for Solving the Problems

To achieve the object, the present invention determines a mold clamping force correspondingly to distribution of mold internal pressure in molding, and performs mold clamping in a state where a force applied to a split surface of a mold becomes non-uniform without resin pressure being applied. Specifically, the mold clamping force by a tie bar is controlled so that a large force is applied to the split surface of the mold around a region with high mold internal pressure, and a small force is applied to the split surface of the mold around a region with low mold internal pressure.

Specifically, the present invention provides a mold clamping apparatus including: a stationary die plate that holds a stationary mold; a movable die plate that holds a movable mold; a die plate moving means that moves the movable die plate toward and away from the stationary die plate; and a mold clamping means that connects and pressurizes the stationary die plate and the movable die plate, wherein the mold clamping means includes a plurality of mold clamping cylinders provided on one of the stationary die plate and the movable die plate, a plurality of tie bars each having one end connected to a ram of the mold clamping cylinder, and the other end having a plurality of ring grooves or screw grooves at regular pitches, a half nut provided on the other of the stationary die plate and the movable die plate and engageable with the plurality of ring grooves or screw grooves, a hydraulic pipe communicating with each of the plurality of mold clamping cylinders, a hydraulic source including a hydraulic pump that supplies oil to the hydraulic pipe, and a control device that controls the supply of the oil from the hydraulic source to the hydraulic pipe, the control device controls the supply of the oil based on a mold clamping force by each of the plurality of tie bars determined correspondingly to an estimated mold opening force by mold internal pressure for molding with mold internal pressure being asymmetrical with respect to a center of a mold block.

In the mold clamping apparatus of the present invention, it is preferable that the mold clamping force by each of the tie bars is determined in such a manner that a flow analysis is previously performed to estimate mold internal pressure and calculate the center of gravity of the mold opening force by the mold internal pressure, and the center of gravity of the mold opening force matches the center of gravity of the mold clamping force by each of the plurality of tie bars. Thus, even with offset of the mold opening force by in-cavity resin pressure, a molding material can be prevented from spouting from a split surface of the mold.

In the mold clamping apparatus of the present invention, it is preferable that the center of gravity of the mold opening force is previously calculated for a progress of an injection process by the flow analysis, and the mold clamping force by each of the tie bars is determined so that the center of gravity of the mold opening force that varies with the progress of the injection process matches the center of gravity of the mold clamping force by each of the plurality of tie bars. This is for accommodating varying mold opening force and center of gravity of the mold opening force in actual injection molding. In this case, the mold clamping force by each of the plurality of tie bars with the progress of the injection process can be switched when a time is up depending on the injection process.

In the mold clamping apparatus of the present invention, the mold opening force by the mold internal pressure may be estimated based on a measured value of the mold internal pressure in a predetermined position. The mold internal pressure may be measured in injection molding performed for a try before injection molding in production.

In this case, the mold internal pressure value in the predetermined position, the mold opening force by the mold internal pressure, and the center of gravity of the mold opening force are calculated for the progress of the injection process by the flow analysis, and for the mold internal pressure value, the mold opening force, and the center of gravity of the mold opening force in the predetermined position that varies with the progress of the injection process, at a time when the measured value of the mold internal pressure reaches the mold internal pressure in the predetermined position that is previously calculated, a mold clamping hydraulic value applied to each of the tie bars is determined so that the center of gravity of the mold clamping force applied to the die plate by each of the plurality of tie bars matches the mold opening force by the mold internal pressure and the center of gravity of the mold opening force previously calculated by the flow analysis, and hydraulic pressure supplied to each of the tie bars can be distributed so that the determined mold clamping hydraulic value is reached.

In the mold clamping apparatus of the present invention, it is preferable that the mold clamping apparatus includes a plurality of hydraulic sources corresponding to a plurality of mold clamping cylinders, the control device supplies oil discharged from all the hydraulic sources to each of the mold clamping cylinders through a common pipe at the beginning of pressure increase in supplying oil to each of the mold clamping cylinders, at a time when each predetermined mold clamping hydraulic value corresponding to each mold clamping cylinder is reached in a pressure increasing process, the supply of the oil from the hydraulic source through the common pipe to the mold clamping cylinder is stopped, and the supply of the oil is started from a hydraulic source and a hydraulic pipe independent of the common pipe.

Advantage of the Invention

With the present invention, the mold clamping force by the tie bar can be determined correspondingly to the distribution of the mold opening force, and thus even if a cavity having a complex shape with a thin portion with high flow pressure loss mixed causes significant offset of the mold internal pressure, production of burrs can be prevented. Also, if the mold clamping force is switched with the progress of the molding process, a necessary and sufficient low mold clamping force only may be applied to the mold, thereby minimizing the load on the mold and extending the life of the mold. The present invention is also effectively applied to molding using a mold including a plurality of cavities having the same shape or different shapes, such that cavities are successively filled in a mold in which the cavities are asymmetrical with respect to a center of each die plate.

Figure 1:
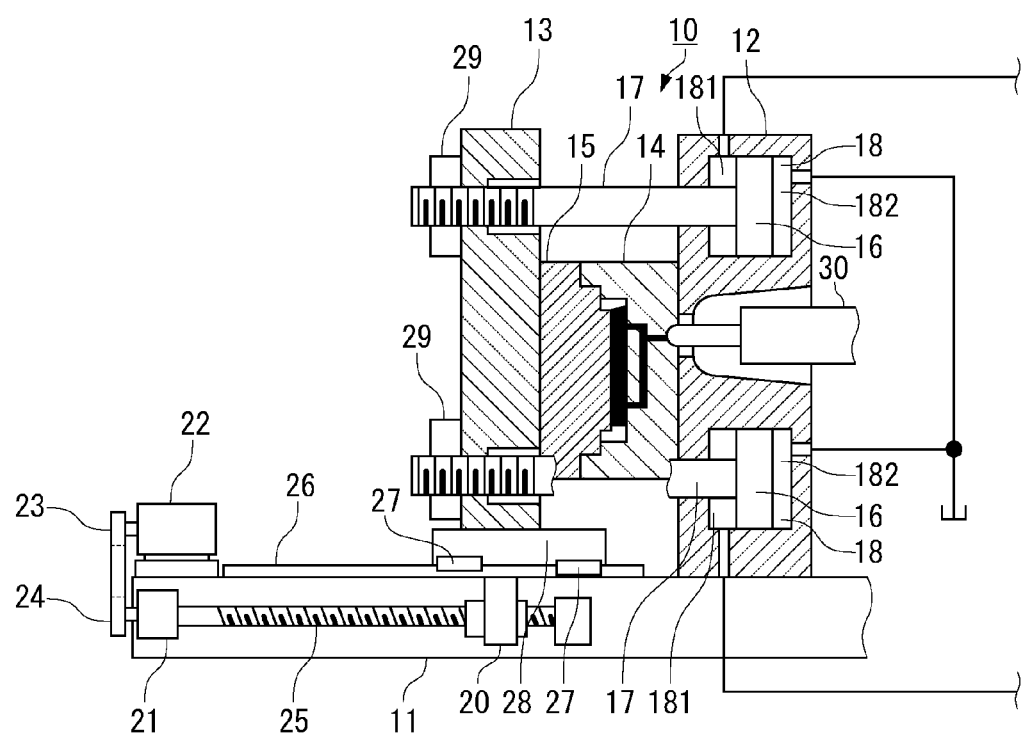
FIG. 1 is a partial sectional view of a configuration of a mold clamping apparatus according to an embodiment.

DESCRIPTION OF SYMBOLS 10 mold clamping apparatus
11 base frame
12 stationary die plate
13 movable die plate
14 stationary mold 15 movable mold
16 ram
17, 17a, 17b, 17c, 17d tie bar
18, 18a, 18b, 18c and 18d mold clamping cylinder
29 half nut
30a, 30b, 30c, 30d hydraulic source
31a, 31b, 31c, 31d changeover valve
32a, 32b, 32c, 32d on-off valve
40, 40a, 40b, 40c, 40d, 41, 41a, 41b, 42, 42c, 42d main pipe
45a, 45b, 45c, 45d auxiliary pipe
50 control device
51 main control unit
52 condition setting unit
53 timer
M1, M2 molded product
N1, N2, N3, N4 pressure sensor

BEST MODE FOR CARRYING OUT THE INVENTION

First Embodiment

Now, the present invention will be described in detail based on embodiments shown in the accompanying drawings.

FIG. 1 is a partial sectional view of a configuration of a mold clamping apparatus 10 according to an embodiment. In this embodiment, an example of applying the mold clamping apparatus 10 to an injection molding machine will be described.

In FIG. 1, a stationary die plate 12 holding a stationary mold 14 is fixedly provided on an upper surface of one end side of a base frame 11.

A movable die plate 13 facing the stationary die plate 12 and holding a movable mold 15 is provided movably forward and backward on an upper surface of the other end side of the base frame 11. A guide rail 26 is laid on the base frame 11, and a linear bearing 27 guided by the guide rail 26 supports the movable die plate 13 via a stage 28.

Four hydraulic mold clamping cylinders 18 of short stroke and having a large sectional area are provided at four corners of the stationary die plate 12. The mold clamping cylinders 18 may be provided on the movable die plate 13. One end of a tie bar 17 is connected to one side surface of a ram 16 that slides in the mold clamping cylinder 18, and the tie bar 17 passes through four through holes provided in the movable die plate 13 when the facing movable die plate 13 is brought close for mold closing.

A hydraulic pipe described later is connected to the mold clamping cylinder 18, and supplies oil to a mold clamping side chamber 181 and a mold opening side chamber 182 in the mold clamping cylinder 18.

A ball screw shaft 25 that is rotatably supported and axially restrained by a bearing box 20 provided in parallel with a moving direction of the movable die plate 13 and held by the stationary die plate 12 and a bearing box 21 held by the base frame 11, and driven by a servomotor 22 via power transmission gears 23 and 24 constitutes moving means of the movable die plate 13. The number and speed of rotation of the ball screw shaft 25 are controlled by an unshown control device via the servomotor 22.

In the other end of each tie bar 17, a plurality of ring grooves (or screw groove) are formed at regular pitches. On a back surface of the movable die plate 13, a half nut 29 that engages the ring groove in each tie bar 17 is provided.

In the mold clamping apparatus 10 described above, the movable die plate 13 is moved by rotation of the ball screw shaft 25 driven by the servomotor 22 from a state where the stationary mold 14 and the movable mold 15 are opened to a state where the stationary mold 14 and the movable mold 15 are closed as shown in FIG. 1. The movable die plate 13 is slowly accelerated in this process and moved at a constant speed, and then decelerated and stopped immediately before the stationary mold 14 is brought into contact with the movable mold 15.

In a stop position of the movable die plate 13, the half nut 29 is operated and an inner ring groove in the half nut 29 engages the ring groove in a tip of the tie bar 17 to connect the tie bar 17 and the half nut 29. Then, the mold clamping side chamber 181 of the mold clamping cylinder 18 is increased in pressure to perform compression mold clamping. After the mold clamping is thus performed, molten resin is injected from an injection cylinder 30 into a cavity formed by the stationary mold 14 and the movable mold 15 to mold a molded product.

Figure 2:
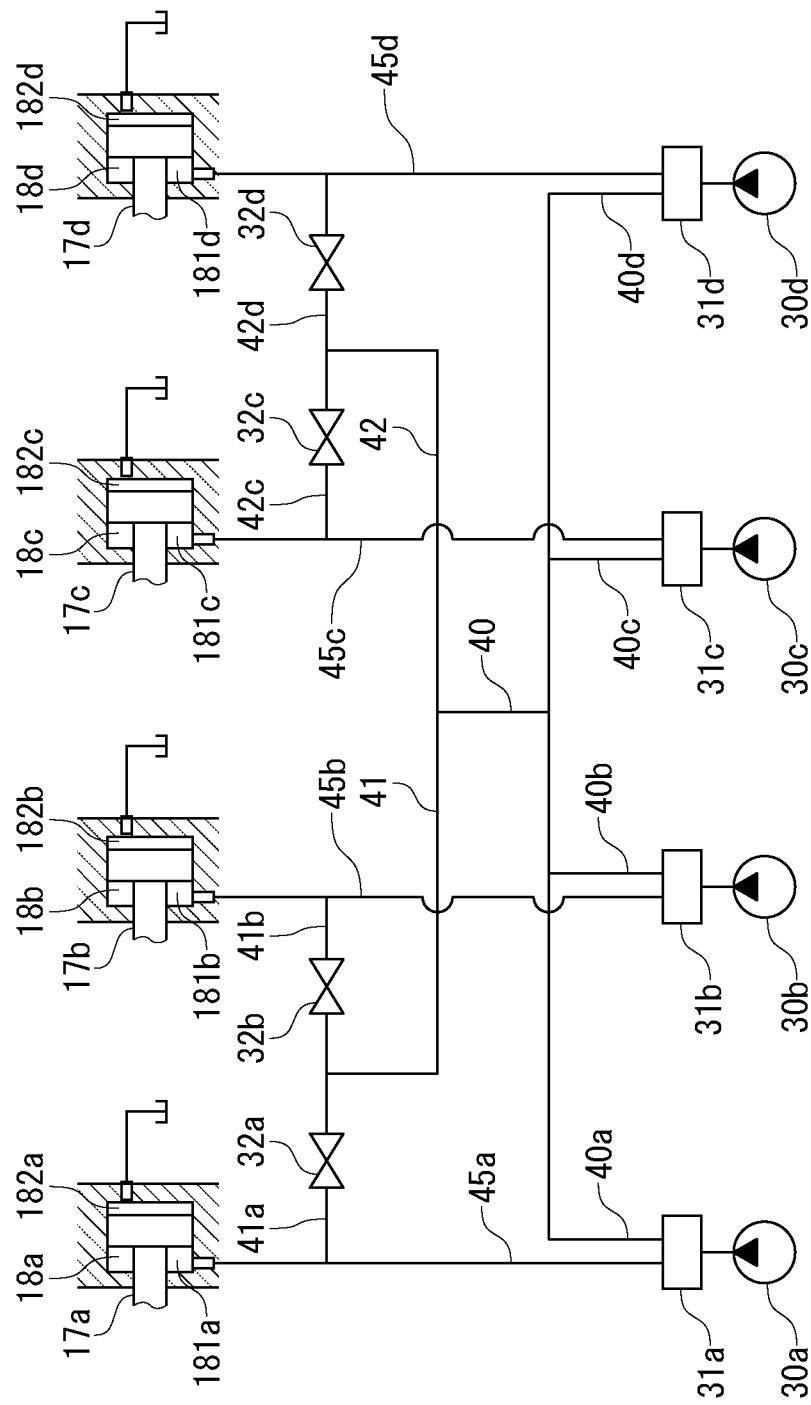
FIG. 2 shows a hydraulic pipe connected to the mold clamping apparatus shown in FIG. 1.

FIG. 2 shows a hydraulic pipe connected to the mold clamping apparatus 10.

The hydraulic pipe includes four hydraulic sources 30a, 30b, 30c and 30d correspondingly to the mold clamping cylinder 18 (18a, 18b, 18c and 18d). Changeover valves 31a, 31b, 31c and 31d are provided correspondingly to the hydraulic sources 30a, 30b, 30c and 30d.

A main pipe 40a and an auxiliary pipe 45a are connected to the changeover valve 31a. The changeover valve 31a selectively connects the main pipe 40a or the auxiliary pipe 45a to the hydraulic source 30a. The changeover valve 31a disconnects the main pipe 40a and the auxiliary pipe 45a from the hydraulic source 30a. The same applies to relationships between the hydraulic source 30b and the changeover valve 31b, between the hydraulic source 30c and the changeover valve 31c, and between the hydraulic source 30d and the changeover valve 31d.

The main pipe 40a connected to the changeover valve 31a, the main pipe 40b connected to the changeover valve 31b, the main pipe 40c connected to the changeover valve 31c, and the main pipe 40d connected to the changeover valve 31d merge into the main pipe 40, and the main pipe 40 is then divided into main pipes 41 and 42. Further, the main pipe 41 is divided into main pipes 41a and 41b, and the main pipe 42 is divided into main pipes 42c and 42d. The main pipes 41a, 41b, 42c and 42d include on-off valves 32a, 32b, 32c and 32d, respectively. The main pipe 41a is connected to the mold clamping side chamber 181a of the mold clamping cylinder 18a, the main pipe 41b is connected to the mold clamping side chamber 181b of the mold clamping cylinder 18b, the main pipe 42c is connected to the mold clamping side chamber 181c of the mold clamping cylinder 18c, and the main pipe 42d is connected to the mold clamping side chamber 181d of the mold clamping cylinder 18d. The auxiliary pipe 45a connected to the changeover valve 31a merges into the main pipe 41a. Similarly, the auxiliary pipe 45b merges into the main pipe 41b, the auxiliary pipe 45c merges into the main pipe 42c, and the auxiliary pipe 45d merges into the main pipe 42d. A pressure control valve or other valves may be provided in any of the pipes.

When the mold clamping cylinder 18 (18a, 18b, 18c and 18d) requires a large flow amount of oil as at the beginning of pressure increase, oil is supplied through the main pipe (41a . . .) and the auxiliary pipe (45a . . .). When the mold clamping cylinder 18 (18a, 18b, 18c and 18d) requires a small flow amount of oil, oil is supplied through the auxiliary pipe (45a . . .). The main pipe (41a . . .) is designed to have a larger flow amount and be more robust than the auxiliary pipe (45a . . .).

Figure 3:
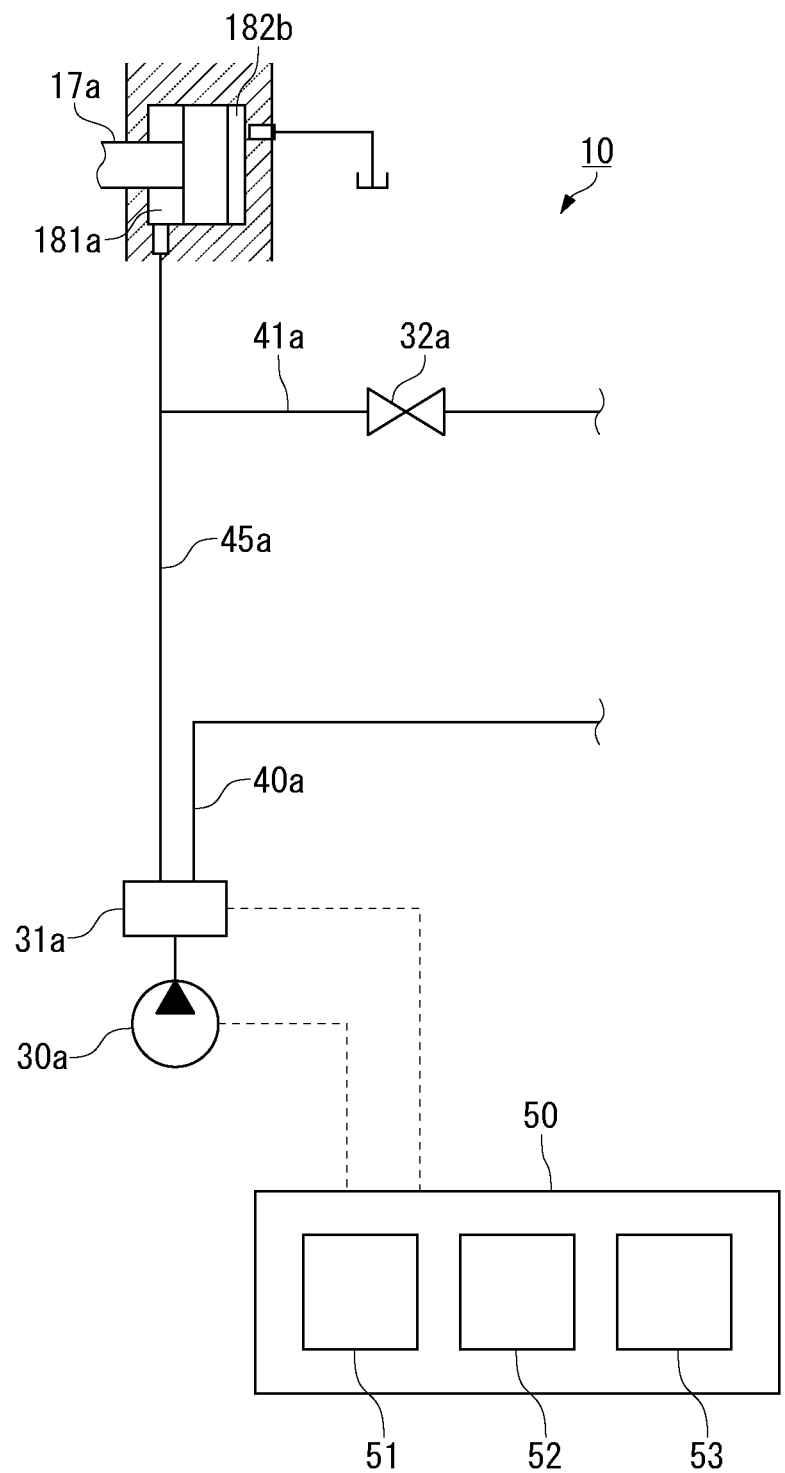
FIG. 3 shows a control system of a hydraulic pipe shown in FIG. 2.

FIG. 3 shows a control system of the hydraulic pipe. FIG. 3 shows only the hydraulic source 30a and the changeover valve 31a.

As shown in FIG. 3, the mold clamping apparatus 10 includes a control device 50 that controls operations of the hydraulic source 30a and the changeover valve 31a. The control device 50 includes a main control unit 51, a condition setting unit 52, and a timer 53. In the condition setting unit 52, a mold clamping force of the mold clamping cylinder 18 (18a, 18b, 18c and 18d) obtained based on a flow analysis described later is set. The main control unit 51 controls the operations of the hydraulic source 30a and the changeover valve 31a based on the mold clamping force set in the condition setting unit 52 to supply oil to the mold clamping cylinder 18 (18a, 18b, 18c and 18d).

Figure 4:
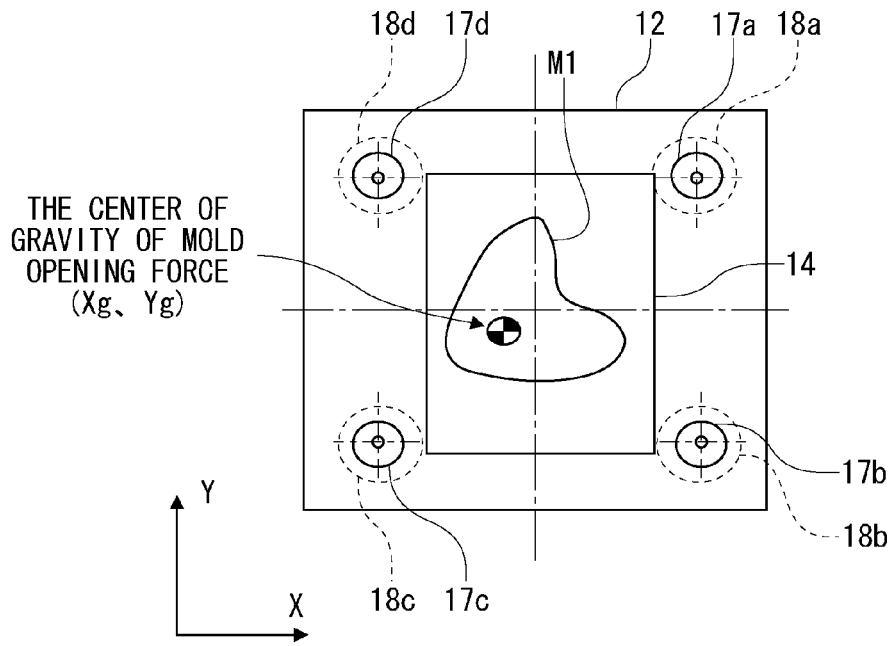
FIG. 4 illustrates a method of identifying a mold clamping force by a flow analysis.

FIG. 4 illustrates a method of determining a mold clamping force by a flow analysis, and schematically shows sections of the stationary die plate 12 and the stationary mold 14. FIG. 4 is based on molding a molded product M1.

In FIG. 4, the mold clamping cylinders 18a, 18b, 18c and 18d are formed at four corners of the stationary die plate 12, and mold clamping forces by the cylinders 18a, 18b, 18c and 18d are denoted by F1, F2, F3 and F4, respectively. Coordinates of central positions of the tie bars 17a, 17b, 17c and 17d corresponding to the cylinders 18a, 18b, 18c and 18d are (X1, Y1), (X2, Y2), (X3, Y3) and (X4, Y4). An X-Y coordinate is as shown by arrows in FIG. 4.

A coordinate of the center of gravity of a force (mold opening force) to open the stationary mold 14 and the movable mold 15 by pressure of resin that constitutes the molded product M1 is (Xg, Yg), mold opening pressure (resin pressure) at an arbitrary point is Pi, an area to which the mold opening pressure is applied (projection area of the molded product M1) is A, and a coordinate of the center of gravity of the mold clamping force is (Xg', Yg').

Then, the coordinate (Xg, Yg) of the center of gravity of the mold opening force is expressed by Expression (1), and the coordinate (Xg', Yg') of the center of gravity of the mold clamping force is expressed by Expression (2).

[Expression 1]

$$X_g = \frac{\sum (P_i \times x_i)}{\sum P_i} \\ Y_g = \frac{\sum (P_i \times y_i)}{\sum P_i} \Bigg\} \quad \text{Expression (1)}$$

[Expression 2]

$$X'_g = \frac{\sum (F_i \times x_i)}{\sum F_i} \\ Y'_g = \frac{\sum (F_i \times y_i)}{\sum F_i} \Bigg\} \quad \text{Expression (2)}$$

If the mold clamping forces F1 to F4 are determined so that the center of gravity of the mold clamping force matches the center of gravity of the mold opening force (Xg=Xg' and Yg=Yg'), a molding material can be prevented from spouting from a split surface of the mold even with offset of the mold opening force by in-cavity resin pressure.

Thus, a flow analysis of resin injected into the cavity is previously performed to calculate the coordinate of the center of gravity of the mold opening force (Xg, Yg), and the mold clamping forces F1 to F4 are determined for the following four cases. In actual injection molding, the mold clamping forces F1 to F4 are applied via the tie bar 17.

(1) The case where Xg=0 and Yg=0

Uniform mold clamping is performed with F1=F2=F3=F4. The center of the stationary mold 14 is (0, 0) of the X-Y coordinate.

(2) The case where Xg≠0 and Yg=0

Laterally non-uniform mold clamping is performed with F1=F2 and F3=F4.

In this case, F3=α*F1, and F1 and α are derived from Expression (3) (simultaneous equations) below. A left-hand side of Expression (3) is ΣFi=F1+F2+F3+F4. Herein, F1=F2 and F3=F4, and thus ΣFi=F1+F1+αF1+αF1=2(1+α)F1.

[Expression 3]

$$X_g = X'_g \\ \sum F_i = \int_A P\, dA \Bigg\} \quad \text{Expression (3)}$$

(3) The case where Xg=0 and Yg≠0

Vertically non-uniform mold clamping is performed with F1=F4 and F2=F3.

In this case, F2=β*F1, and F1 and β are derived from Expression (4) (simultaneous equations) below. Herein, F1=F4 and F2=F3, and thus ΣFi=F1+βF1+βF1+F1=2(1+β)F1

[Expression 4]

$$Y_g = Y'_g \\ \sum F_i = \int_A P\, dA \Bigg\} \quad \text{Expression (4)}$$

(4) The case where Xg≠0 and Yg≠0

Non-uniform mold clamping is performed with all the four corners (tie bars 17a to 17d) being different.

In this case, F2=β*F1, F3=α*β*F1, and F4=α*F1, and F1, α, and β are derived from Expression (5) (simultaneous equations) below. This case is an overlap of the cases (2) and (3) above.

[Expression 5]

$$X_g = X'_g \\ Y_g = Y'_g \\ \sum F_i = \int_A P\, dA \Bigg\} \quad \text{Expression (5)}$$

As described above, F1 to F4 are calculated in the four cases, and reflected in the control device 50 of the mold clamping apparatus 10 as described below. For example, in the case where Xg≠0 and Yg=0, a left-hand side (the center of gravity position of pressure calculated from the sum of pressure) in an upper equation of Expression (3) and the sum of pressure (right-hand side) in a lower equation are calculated by the flow analysis. Then, Expression (3) includes two unknowns of α and F1 and two simultaneous equations, and thus α and F1 are calculated. This is applied to a time history of the flow analysis to calculate α and F1 at each time. Thus, for example, the mold is controlled by the case (2) so that α=60% and F1=400 tonf from the injection start to T=0 to 5 sec, and α=70% and F1=700 tonf at T=5 to 10 sec.

Figure 5A:
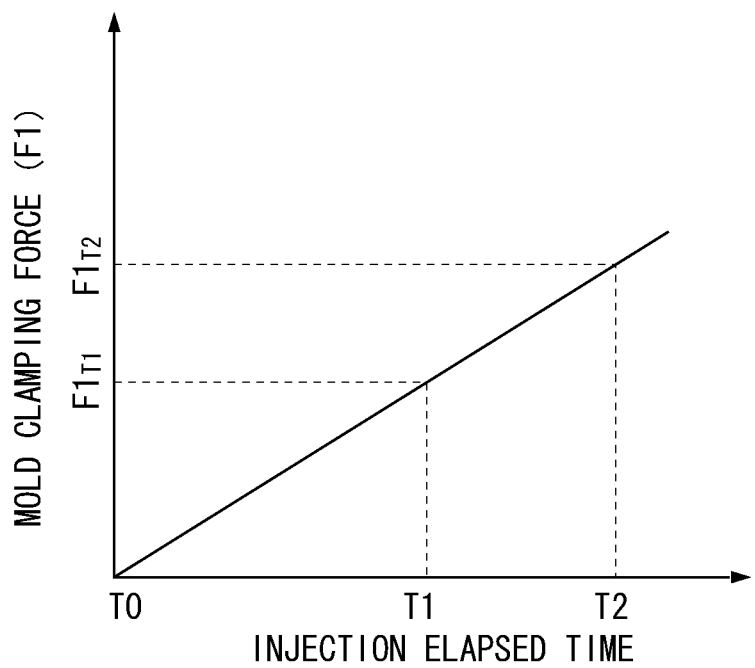
FIG. 5 is a graph showing a relationship between an elapsed time from an injection start and a mold clamping force by a tie bar.
Figure 5B:
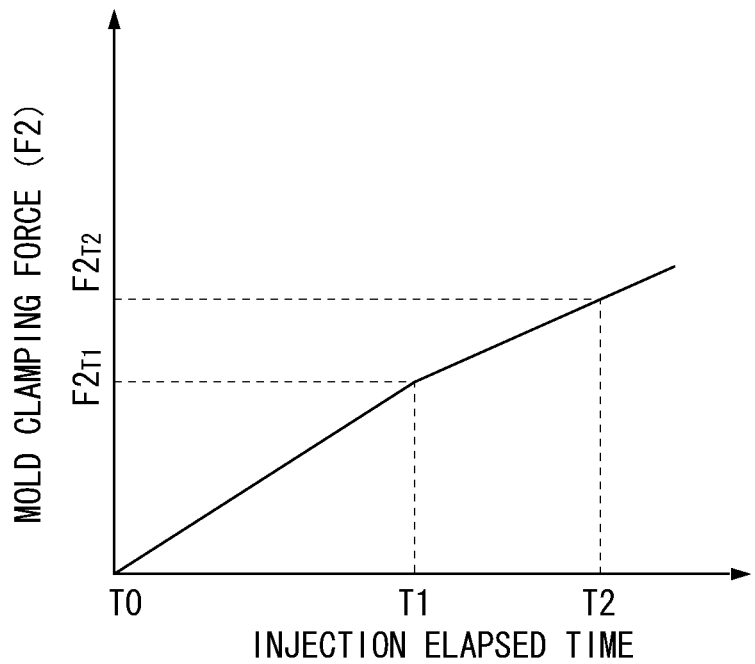
Figure 6A:
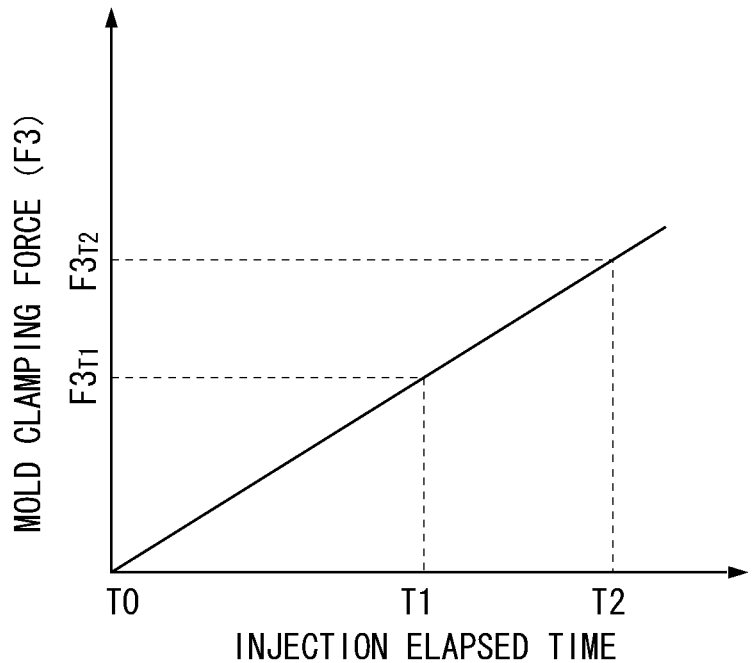
FIG. 6 is a graph showing the relationship between the elapsed time from the injection start and the mold clamping force by the tie bar.
Figure 6B:
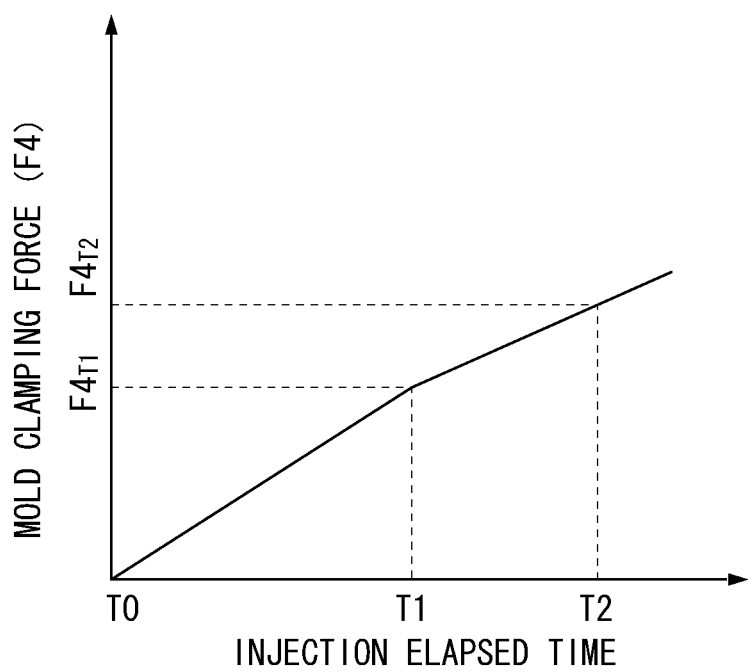

The above-described flow analysis performs calculation every arbitrary elapsed time point between the injection start and injection finish. Specifically, coordinates of the center of gravity of the mold opening forces $(Xg_{T0}, Yg_{T0})$, $(Xg_{T1}, Yg_{T1})$, $(Xg_{T2}, Yg_{T2})$ . . . are calculated every elapsed time point such as at the injection start (after T0 sec), after T1 sec from the injection start, and after T2 sec from the injection start . . . . Then, the mold clamping forces by the tie bars 17a to 17d may be determined so that coordinates of the center of gravity of the mold clamping forces $(Xg'_{T0}, Yg'_{T0})$, $(Xg'_{T1}, Yg'_{T1})$, $(Xg'_{T2}, Yg'_{T2})$ . . . at elapsed time points match coordinates of the center of gravity of the mold opening forces $(Xg_{T0}, Yg_{T0})$, $(Xg_{T1}, Yg_{T1})$, $(Xg_{T2}, Yg_{T2})$ . . . . The mold clamping forces at the elapsed time points are indicated as below. These are shown as in FIGS. 5 and 6.

T0: $F1_{T0}, F2_{T0}, F3_{T0}, F4_{T0}$

T1: $F1_{T1}, F2_{T1}, F3_{T1}, F4_{T1}$

T2: $F1_{T2}, F2_{T2}, F3_{T2}, F4_{T2}$

As described above, the mold clamping forces are calculated by the flow analysis, and then input and set in the condition setting unit 52 in the control device 50. The main control unit 51 controls the operations of the hydraulic sources 30a to 30d and the changeover valves 31a to 31d so as to obtain the mold clamping forces F1 to F4 set in the condition setting unit 52, and supplies oil to the mold clamping cylinders 18 (18a, 18b, 18c and 18d). For example, the mold clamping force can be switched from $F1_{T1}$ to $F1_{T2}$ by the main control unit 51 grasping when T1 of a timer 53 is up.

Second Embodiment

Next, an example of estimating the mold opening force based on a measured value of mold internal pressure will be described with reference to FIG. 7.

A basic configuration of a mold clamping apparatus 10 used in the second embodiment is the same as in the first embodiment, and descriptions thereof will be omitted. In FIG. 7, the same components as in FIG. 4 are denoted by the same reference numerals.

In the second embodiment, pressure sensors N1 to N3 are provided on a cavity surface of a stationary mold 14, and the pressure sensors N1 to N3 measure mold internal pressure by a molded product M2 injected into the cavity.

Positions (coordinates) and mold internal pressure of the pressure sensors N1 to N3 are as described below. A coordinate of the center of gravity of the mold opening force is (Xg, Yg).

Pressure sensor N1: coordinate (x1, y1), mold internal pressure P1

Pressure sensor N2: coordinate (x2, y2), mold internal pressure P2

Pressure sensor N3: coordinate (x3, y3), mold internal pressure P3

Figure 7:
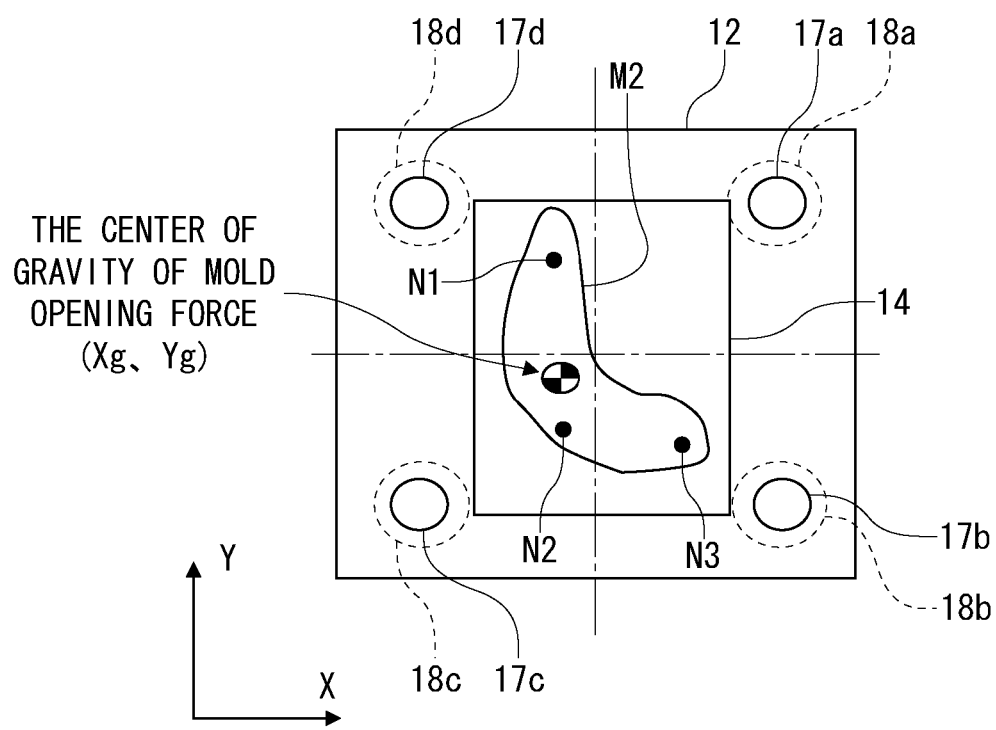
FIG. 7 illustrates a method of estimating a mold opening force based on a measured value of mold internal pressure.

As shown in FIG. 7, when measurement is performed by the pressure sensors N1 to N3, that is, at three points, the coordinate of the center of gravity of the mold opening force (Xg, Yg) can be calculated by Expression (6) below.

[Expression 6]

$$X_g = \frac{P_1 \times x_1 + P_2 \times x_2 + P_3 \times x_3}{P_1 + P_2 + P_3} \\ Y_g = \frac{P_1 \times y_1 + P_2 \times y_2 + P_3 \times y_3}{P_1 + P_2 + P_3}$$

Expression (6)

When the coordinate of the center of gravity of the mold opening force (Xg, Yg) is calculated, as in the first embodiment, F1 to F4 may be determined so that the coordinate of the center of gravity of the mold clamping force (Xg', Yg') obtained by Expression (2) matches the coordinate of the center of gravity of the mold opening force (Xg, Yg) (Xg=Xg' and Yg=Yg').

The example of measuring the mold internal pressure by the molded product M2 at the three points in the cavity is described above, but it should be understood that the pressure can be measured at the arbitrary number of points (i points). In this case, the coordinate of the center of gravity of the mold opening force (Xg, Yg) can be calculated by Expression (7) below.

[Expression 7]

$$X_g = \frac{\sum (P_i \times x_i)}{\sum P_i} \\ Y_g = \frac{\sum (P_i \times y_i)}{\sum P_i}$$

Expression (7)

The method of calculating the coordinate of the center of gravity of the mold opening force (Xg, Yg) using the pressure sensor (Ni) is as described above, and the coordinate of the center of gravity of the mold opening force (Xg, Yg) is calculated every arbitrary elapsed time point between the injection start and the injection finish as in the first embodiment. Specifically, coordinates of the center of gravity of the mold opening forces $(Xg_{T0}, Yg_{T0})$, $(Xg_{T1}, Yg_{T1})$, $(Xg_{T2}, Yg_{T2})$ . . . are calculated every elapsed time point such as at the injection start (after T0 sec), after T1 sec from the injection start, and after T2 sec from the injection start . . . . Then, the mold clamping forces F1 to F4 may be determined so that coordinates of the center of gravity of the mold clamping forces $(Xg'_{T0}, Yg'_{T0})$, $(Xg'_{T1}, Yg'_{T1})$, $(Xg'_{T2}, Yg'_{T2})$ . . . at elapsed time points match coordinates of the center of gravity of the mold opening forces $(Xg_{T0}, Yg_{T0})$, $(Xg_{T1}, Yg_{T1})$, $(Xg_{T2}, Yg_{T2})$ . . . .

The mold clamping forces are calculated as described above, and then input and set in the condition setting unit 52 in the control device 50. The main control unit 51 controls the operations of the hydraulic sources 30a to 30d and the changeover valves 31a to 31d so as to obtain the mold clamping forces F1 to F4 set in the condition setting unit 52, and supplies oil to the mold clamping cylinder 18 (18a, 18b, 18c and 18d). For example, the mold clamping force can be switched from $F1_{T1}$ to $F1_{T2}$ by the main control unit 51 grasping when T1 of a timer 53 is up.

Third Embodiment

Figure 8A:
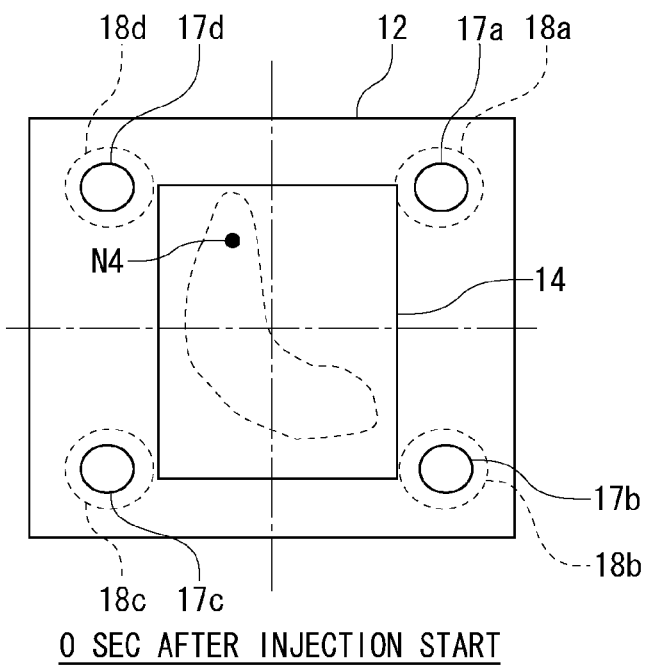
FIG. 8A schematically shows an injection state in a mold at the injection start.
Figure 8B:
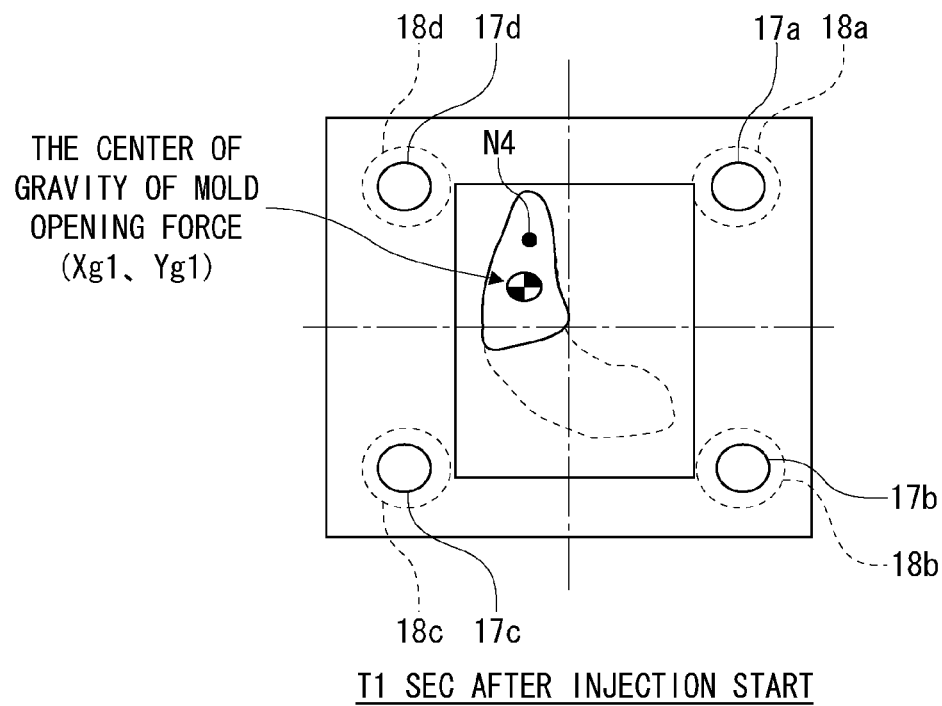
FIG. 8B schematically shows an injection state in the mold when T1 sec has elapsed since the injection start.
Figure 9:
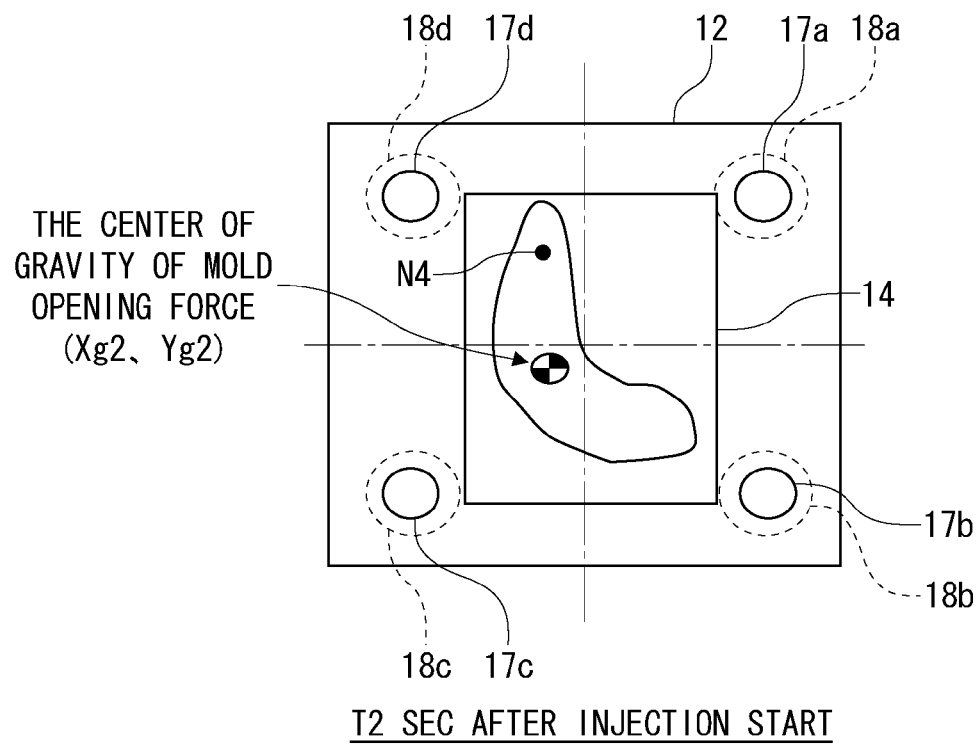
FIG. 9 schematically shows an injection state in the mold when T2 sec has elapsed since the injection start.
Figure 10:
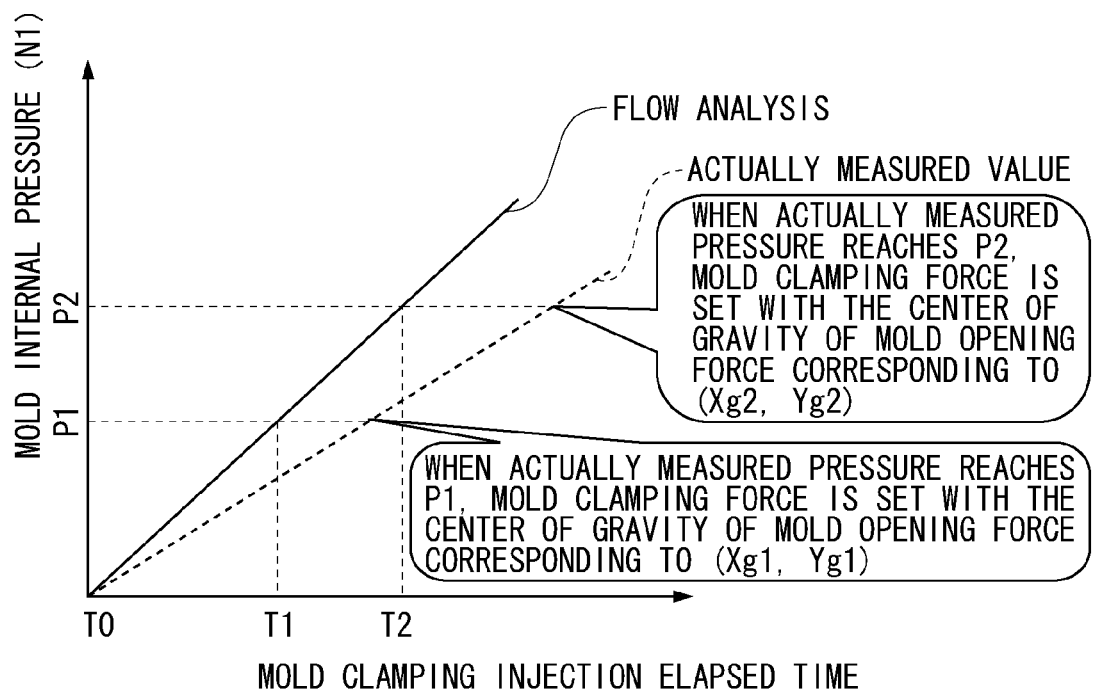
FIG. 10 shows a relationship between pressure in an arbitrary position in the cavity and an elapsed time from the injection start.

Injection molding states in a mold at an injection start (after T0 sec), after T1 sec from the injection start, and after T2 sec from the injection start . . . are as shown in FIGS. 8 to 10.

As in the first embodiment, a coordinate of the center of gravity of the mold opening force (Xg, Yg), mold opening pressure Pi at an arbitrary point, and a coordinate of the center of gravity of the mold clamping force (Xg', Yg') at the injection start (after T0 sec), after T1 sec from the injection start, and after T2 sec from the injection start are calculated by a flow analysis. The mold clamping forces at elapsed time points are indicated as below as in the first embodiment.

T0: $F1_{T0}$, $F2_{T0}$, $F3_{T0}$, $F4_{T0}$
T1: $F1_{T1}$, $F2_{T1}$, $F3_{T1}$, $F4_{T1}$
T2: $F1_{T2}$, $F2_{T2}$, $F3_{T2}$, $F4_{T2}$

Pressure at the arbitrary position indicated by ● in the cavity shown in FIGS. 8 to 10 at the injection start (after T0 sec), after T1 sec from the injection start, and after T2 sec from the injection start are indicated as below. This is shown by a solid line in FIG. 11.

T0: N1, T1: N1, T3: N2

Meanwhile, as shown in FIGS. 8 to 10, a pressure sensor N4 is provided at the arbitrary position (●) in the cavity, and when a molded product is actually injection molded, the pressure sensor N4 measures the mold internal pressure with time. Then, when the pressure measured by the pressure sensor N4 reaches P1, a mold clamping force is set with the center of gravity of the mold opening force corresponding to (Xg1, Yg1) regardless of whether the time from the injection start is T1. When the pressure measured by the pressure sensor N4 reaches P2, a mold clamping force is set with the center of gravity of the mold opening force corresponding to (Xg2, Yg2) regardless of whether the time from the injection start is T2. Since the time to reach the center of gravity of the mold opening force previously predicted by the flow analysis may be deviated from a measured value, pressure at the arbitrary point N4 is measured, and the center of gravity position of the mold opening force is estimated from the change of the value.

This is based on the premise that there may be a deviation between a pressure time history of the flow analysis and measured pressure. This deviation is caused by the fact that there are differences between values used in the flow analysis and actually measured values for viscosity or friction of molten resin, and there are differences in time for resin to flow in the mold. However, only measurement is performed, the following problems occur.

When the pressure is actually measured, it is expected that the measurement is performed at a small number of measurement points, and may be performed at one point at the minimum, thereby reducing accuracy of calculating the center of gravity of the pressure from measurement pressure distribution. Thus, it may be difficult to estimate the center of gravity of the pressure only by the measurement. Also, mounting several tens of sensors to increase accuracy requires much work in the mold, which may be practically difficult.

Thus, the flow analysis is combined with actual measurement to estimate the pressure. For example, an operation may be controlled only by the result of the flow analysis, but a time history of pressure at a certain arbitrary point calculated by the flow analysis may be different from a time history of pressure actually measured at the point, and thus the operation is controlled by the measurement result. However, as described above, when the number of measurement points is small, it is difficult to calculate the center of gravity of the pressure from the measurement, and thus control is performed based on the center of gravity calculated by the flow analysis. Thus, the results of the analysis and the actual measurement are combined for molding.

In the first to third embodiments, the mold clamping forces F1 to F4 are calculated so that the coordinate of the center of gravity of the mold clamping force matches the coordinate of the center of gravity of the mold opening force, and determined as values of the mold clamping cylinder setting mold clamping forces. However, there is no problem if each of the actual mold clamping force values of the mold clamping cylinder is not a value such that the coordinate of the center of gravity of the mold clamping force strictly matches the coordinate of the center of gravity of the mold opening force due to variations or fluctuations of accuracy or hydraulic pressure of hydraulic control without departing from the essence of the present invention.

Fourth Embodiment

An example of a procedure of supplying oil to the mold clamping cylinders 18a to 18d shown in FIG. 2 will be described with reference to FIGS. 11 to 13. In this example of the procedure, supply of oil is stopped in order of the cylinders 18a, 18d, 18c and 18d. In FIGS. 11 to 13, pipes through which oil passes are shown by solid lines, and pipes through which oil does not pass are shown by dotted lines. Further, each of hydraulic sources 30a to 30d includes a combination of a large pump with a large amount of discharge and a small pump with a small amount of discharge. Further, in FIGS. 12 to 14, check valves such as ball check valves are provided between the hydraulic sources 30a to 30d and the changeover valves 31a to 31d and in the auxiliary pipes 45a to 45d, but not shown.

(Beginning of Pressure Increase)

Figure 11A:
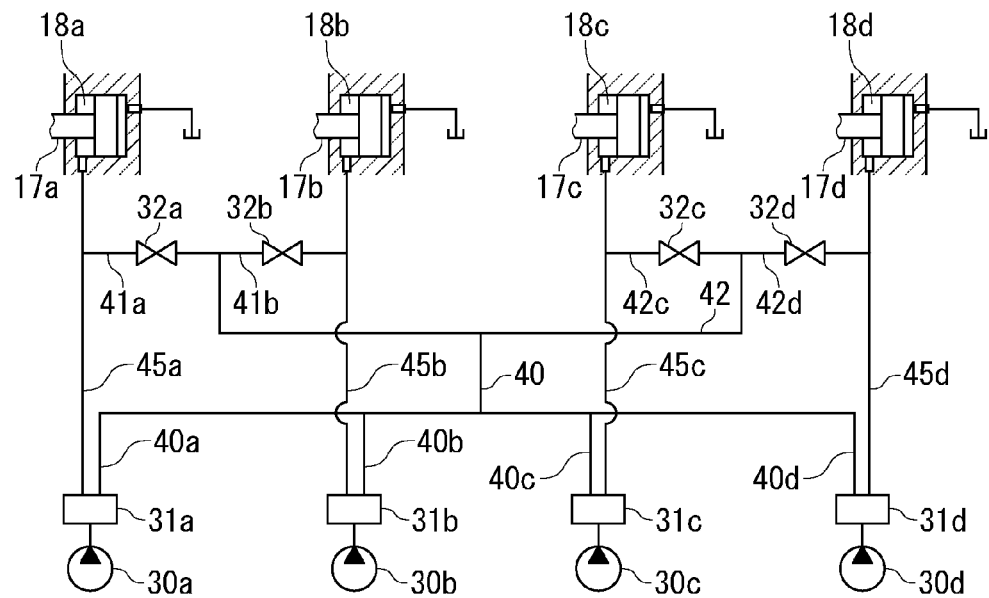
FIG. 11A shows a state where oil discharged from all hydraulic sources is supplied through a main pipe and an auxiliary pipe to a mold clamping cylinder.

At the beginning of pressure increase, as shown in FIG. 11A, oil discharged from all the hydraulic sources 30a to 30d passes through all the main pipes 40a . . . and the auxiliary pipes 45a . . . and is supplied to the mold clamping cylinders 18a to 18d. This is for quickly supplying a large flow amount of oil to the mold clamping cylinders 18a to 18d at the beginning of pressure increase. At this time, the large pump is operated in each of the hydraulic sources 30a to 30d.

(Stop Supply to Mold Clamping Cylinder 18a)

Figure 11B:
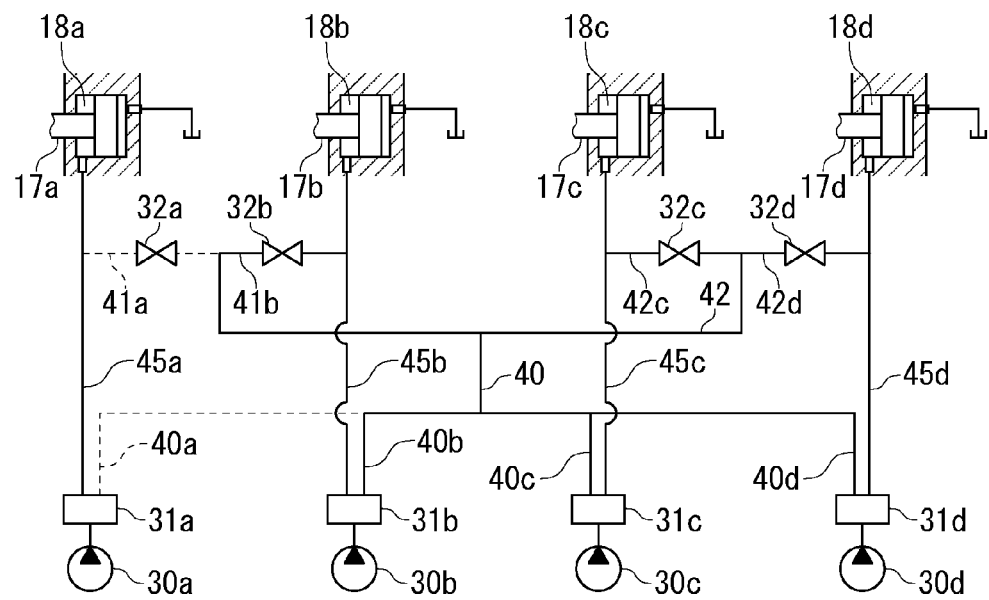
FIG. 11B shows a state of passage of oil in the main pipe and the auxiliary pipe when supply of oil to a mold clamping cylinder 18*a* is stopped.

When the mold clamping force by the tie bar 17a reaches a predetermined value, that is, the mold clamping hydraulic value of the mold clamping cylinder 18a reaches a predetermined value, the supply of oil through the main pipe 40a to the mold clamping cylinder 18a is stopped. In this case, as shown in FIG. 11B, the supply of oil passing through the main pipe 40a is stopped by the changeover valve 31a for the hydraulic source 30a. Simultaneously, the hydraulic source 30a switches from the operation of the large pump to the operation of the small pump. Also, the on-off valve 32a is closed. Thus, to the mold clamping cylinder 18a, oil discharged from the small pump of the hydraulic source 30a is supplied only through the auxiliary pipe 45a. To the mold clamping cylinders 18b to 18d, oil is supplied through the main pipes 40b . . . and the auxiliary pipes 45b . . . as described above.

Figure 12A:
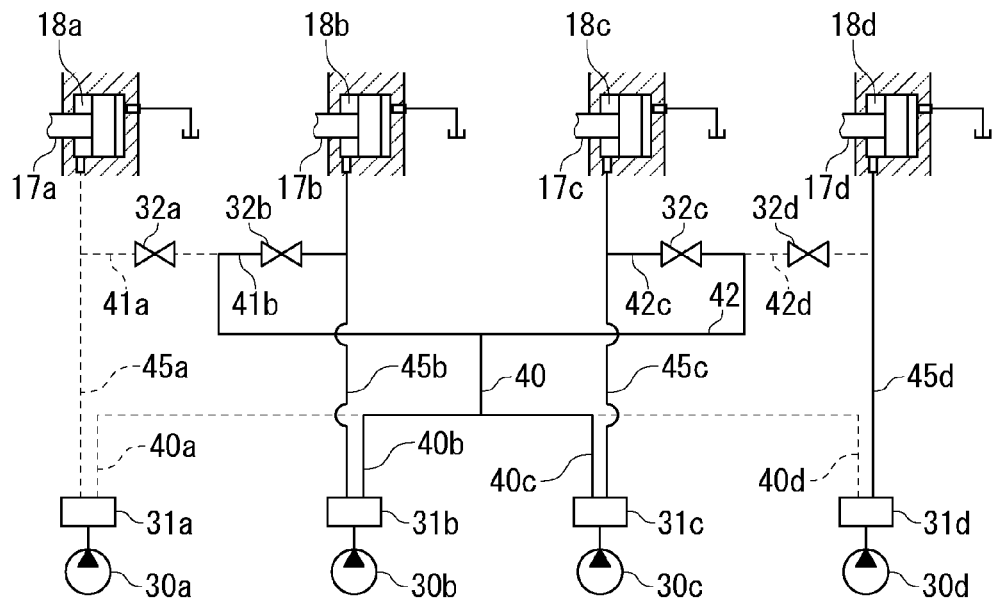
FIG. 12A shows a state of passage of oil in the main pipe and the auxiliary pipe when supply of oil to a mold clamping cylinder 18*d* is stopped.

After this state is maintained for a predetermined time, as shown in FIG. 12A, the hydraulic source 30a is stopped to stop the supply of oil through the auxiliary pipe 45a to the mold clamping cylinder 18a. The supply of oil to the mold clamping cylinder 18a is stopped in two stages because it is not easy to accurately stop the supply of a large flow amount of oil.

(Stop Supply to Mold Clamping Cylinder 18d)

Figure 12B:
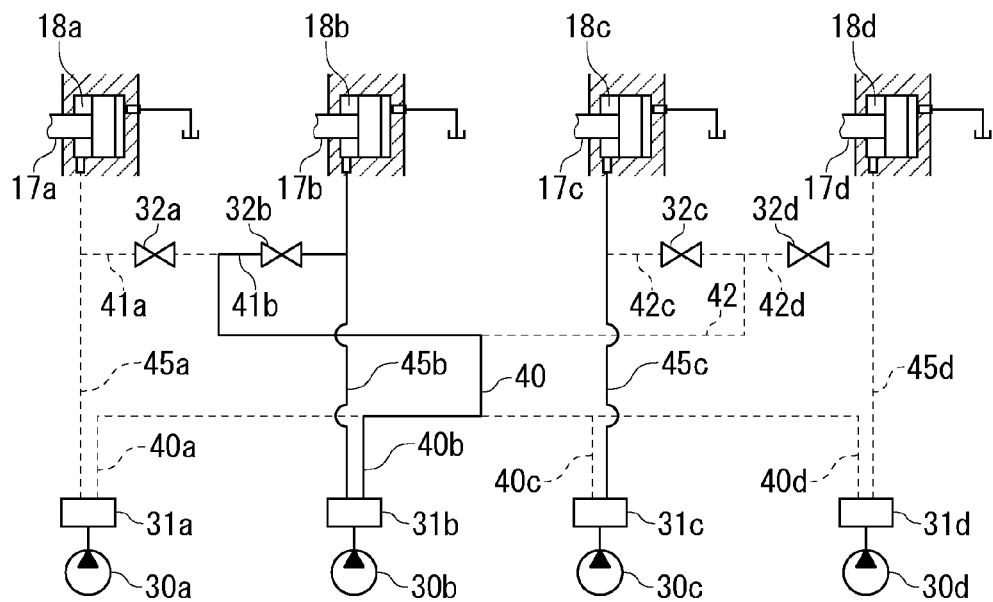
FIG. 12B shows a state of passage of oil in the main pipe and the auxiliary pipe when supply of oil to a mold clamping cylinder 18*c* is stopped.

When the mold clamping hydraulic value of the mold clamping cylinder 18d reaches a predetermined value, the supply of oil through the main pipe 40d is stopped by the changeover valve 31d for the hydraulic source 30d. Simultaneously, the hydraulic source 30d switches from the operation of the large pump to the operation of the small pump. Also, the on-off valve 32d is closed. Thus, to the mold clamping cylinder 18d, oil discharged from the small pump of the hydraulic source 30d is supplied only through the auxiliary pipe 45d. To the mold clamping cylinders 18b to 18c, oil is supplied through the main pipes 40b . . . and the auxiliary pipes 45b . . . as described above. After this state is maintained for a predetermined time, as shown in FIG. 12B, the hydraulic source 30d is stopped to stop the supply of oil through the auxiliary pipe 45d to the mold clamping cylinder 18d.

(Stop Supply to Mold Clamping Cylinder 18c)

Figure 13A:
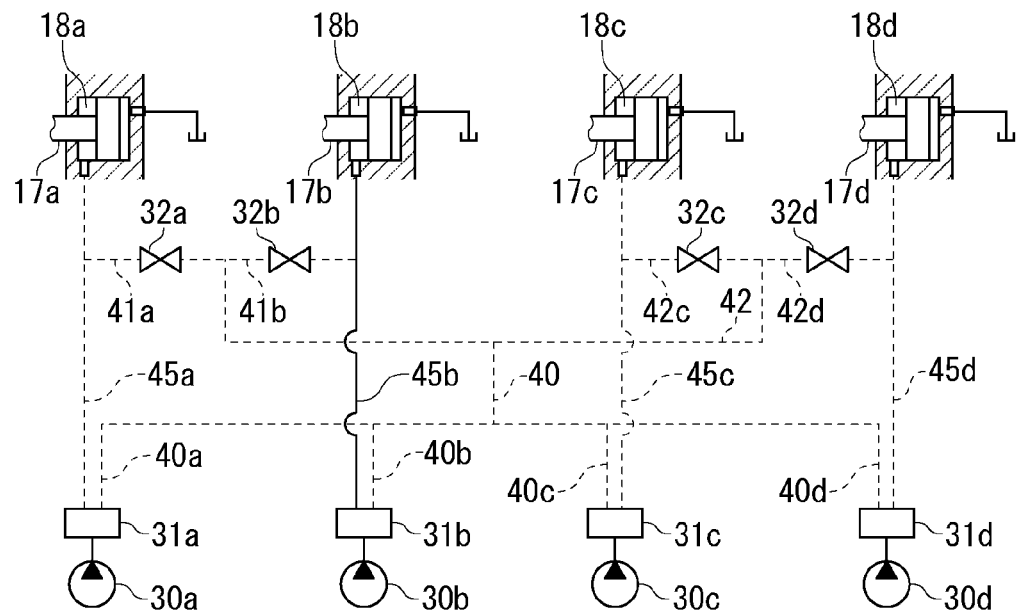
FIG. 13A shows a state of passage of oil in the main pipe and the auxiliary pipe when supply of oil to the mold clamping cylinder 18*b* is stopped.

When the mold clamping hydraulic value of the mold clamping cylinder 18c reaches a predetermined value, the supply of oil through the main pipe 40c is stopped by the changeover valve 31c for the hydraulic source 30c. Simultaneously, the hydraulic source 30c switches from the operation of the large pump to the operation of the small pump. Also, the on-off valve 32c is closed. Thus, to the mold clamping cylinder 18c, oil discharged from the small pump of the hydraulic source 30c is supplied only through the auxiliary pipe 45c. To the mold clamping cylinder 18b, oil is supplied through the main pipes 40b . . . and the auxiliary pipes 45b . . . as described above. After this state is maintained for a predetermined time, as shown in FIG. 13A, the hydraulic source 30c is stopped to stop the supply of oil through the auxiliary pipe 45c to the mold clamping cylinder 18c.

(Stop Supply to Mold Clamping Cylinder 18b)

Figure 13B:
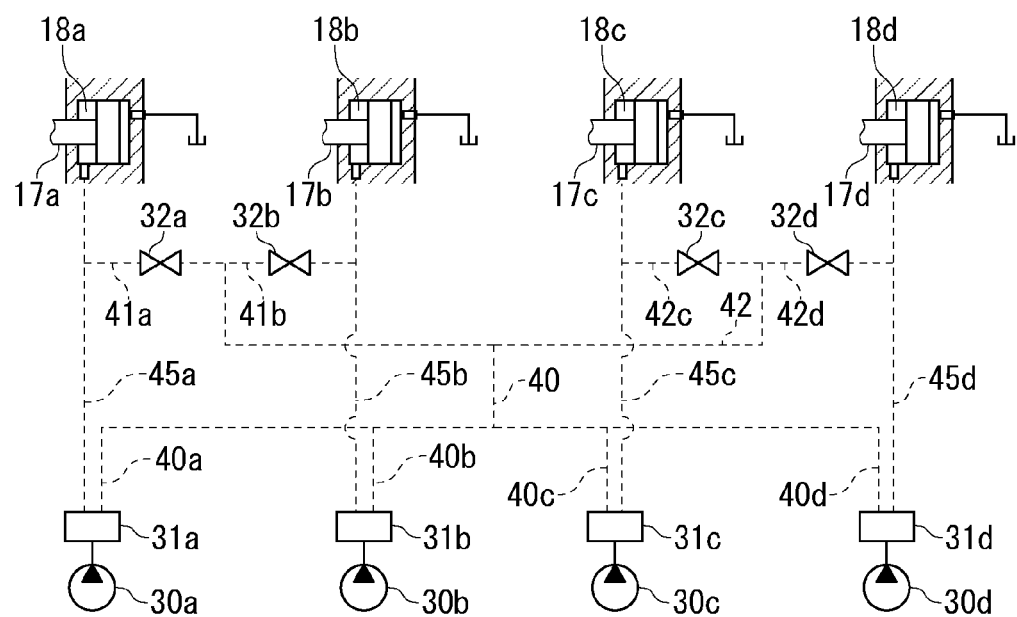
FIG. 13B shows a state of passage of oil in the main pipe and the auxiliary pipe when supply of oil to all mold clamping cylinders 18 is stopped.

When the mold clamping hydraulic value of the mold clamping cylinder 18b reaches a predetermined value, the supply of oil through the main pipe 40b is stopped by the changeover valve 31b for the hydraulic source 30b. Simultaneously, the hydraulic source 30b switches from the operation of the large pump to the operation of the small pump. Also, the on-off valve 32b is closed. Thus, to the mold clamping cylinder 18b, oil discharged from the small pump of the hydraulic source 30b is supplied only through the auxiliary pipe 45b. After this state is maintained for a predetermined time, as shown in FIG. 13B, the hydraulic source 30b is stopped to stop the supply of oil through the auxiliary pipe 45b to the mold clamping cylinder 18c. Thus, the supply of oil to all the mold clamping cylinders 18a to 18d is stopped, and mold clamping of the stationary mold 14 and the movable mold 15 is performed by the mold clamping forces by the tie bars 17a to 17d.

In the fourth embodiment, the oil is supplied through both the main pipe and the auxiliary pipe at the beginning of pressure increase. Alternatively, it may be allowed that only the main pipe is used at the beginning of pressure increase, and at the time when the mold clamping hydraulic value of each mold clamping cylinder reaches a predetermined value, the changeover valve 31 switches an oil supply pipe from the main pipe to the auxiliary pipe to supply the oil.

In the fourth embodiment, the mold clamping hydraulic value of the mold clamping cylinder reaches a predetermined value, then the state where the oil discharged from the small pump of the hydraulic source is supplied only through the auxiliary pipe is maintained for a predetermined time, and then the hydraulic source is stopped. Alternatively, it may be allowed that the hydraulic source is not stopped and the supply of oil is continued to positively maintain the hydraulic pressure of the mold clamping cylinder at the predetermined mold clamping hydraulic value.

In the fourth embodiment, when the basic design of the hydraulic pipe includes only the main pipe (40 or the like), the auxiliary pipe 45a or the like is added, and thus oil can be independently supplied to the mold clamping cylinders 18a to 18d and a supply amount can be controlled. This does not require large design changes in a layout of the pipes, and allows the main pipe that has a large diameter and supplies a large flow amount of oil at the beginning of pressure increase to be shared as a common pipe, and an added pipe is only a pipe that has a small diameter and supplies a small flow amount of oil, thereby reducing space and cost.

The example in which the supply of oil is stopped in order of the mold clamping cylinder 18a, 18d, 18c and 18d has been described above, but not limited to this order. It should be understood that the oil can be supplied to the mold clamping cylinders 18a to 18d according to the first to third embodiments. The hydraulic pipe is not limited to the pipe shown in FIG. 2 (FIGS. 12 to 14) as long as the pipe can supply oil from all of the plurality of hydraulic sources at the beginning of pressure increase, and then independently control the supply of oil from the hydraulic sources.

The invention claimed is:

1. A mold clamping apparatus comprising:
   a mold block comprising a stationary die plate that holds a stationary mold and a movable die plate that holds a movable mold;
   a die plate moving means that moves the movable die plate toward and away from the stationary die plate; and
   a mold clamping means that connects and pressurizes the stationary die plate and the movable die plate,
   wherein the mold clamping means includes a plurality of mold clamping cylinders provided on one of the stationary die plate and the movable die plate,
   a plurality of tie bars each having one end connected to a ram of the mold clamping cylinder, and the other end having a plurality of ring grooves or screw grooves at regular pitches,
   a half nut provided on the other of the stationary die plate and the movable die plate and engageable with the plurality of ring grooves or screw grooves,
   a hydraulic pipe communicating with each of the plurality of mold clamping cylinders,
   a hydraulic source including a hydraulic pump that supplies oil to the hydraulic pipe, and
   a control device that controls the supply of the oil from the hydraulic source to the hydraulic pipe,
   the control device controls the supply of the oil based on a mold clamping force by each of the plurality of tie bars determined correspondingly to an estimated mold opening force by mold internal pressure for molding with the mold internal pressure being asymmetrical with respect to a center of the mold block,
   the hydraulic pipe comprising a common pipe, an auxiliary pipe, and a changeover valve connected to the common pipe and the auxiliary pipe, said changeover valve provided correspondingly to the hydraulic source, and
   the control device is configured to control the changeover valve depending on a flow amount of the oil required by the mold clamping cylinder.

2. The mold clamping apparatus according to claim 1, wherein the control device is configured to determine the mold clamping force by each of the tie bars in such a manner that a flow analysis is first performed to estimate the mold internal pressure and calculate the center of gravity of the mold opening force by the mold internal pressure, and the center of gravity of the mold opening force matches the center of gravity of the mold clamping force by all of the plurality of tie bars.

3. The mold clamping apparatus according to claim 2, wherein
the control device is configured to calculate the center of gravity of the mold opening force for a progress of an injection process by the flow analysis, and
control device is configured to determine the mold clamping force by each of the plurality of tie bars is determined so that the center of gravity of the mold opening force that varies with the progress of the injection process matches the center of gravity of the mold clamping force by all of the plurality of tie bars, and
the mold clamping force is continuously controlled during the injection molding process.

4. The mold clamping apparatus according to claim 3, wherein the mold clamping force of each of the plurality of tie bars is changed at a predetermined time during the injection process.

5. The mold clamping apparatus according to claim 1, wherein control device is configured to calculate the mold opening force by the mold internal pressure based on a measured value of the mold internal pressure in a predetermined position.

6. The mold clamping apparatus according to claim 5, wherein:
the mold internal pressure in a predetermined position and the center of gravity of the mold opening force by the mold internal pressure are calculated by a flow analysis during an injection process; and
the control device is configured to:
determine a mold clamping hydraulic value applied to each of the tie bars when the measured value reaches a value of the mold internal pressure calculated by the flow analysis, so that the center of gravity of the mold opening force matches the center of gravity of the mold clamping force applied to the mold block by all of the plurality of tie bars; and
distribute hydraulic pressure supplied to each of the tie bars so that the determined mold clamping hydraulic value is reached.

7. The mold clamping apparatus according to claim 1, wherein the mold clamping apparatus further comprises:
a plurality of the hydraulic sources corresponding to the plurality of mold clamping cylinders, wherein
the auxiliary pipe communicates directly with one of the plurality of mold clamping cylinders;
the control device is configured to supply the oil discharged from the plurality of hydraulic sources to each of the corresponding mold clamping cylinders through the common pipe at the beginning of pressure increase in supplying the oil to each of the mold clamping cylinders, and
the control device is configured such that at a time when each predetermined mold clamping hydraulic value corresponding to each mold clamping cylinder is reached in a pressure increasing process, the supply of the oil from the hydraulic source through the common pipe to the mold clamping cylinder having reached the predetermined mold clamping hydraulic value is stopped, and
the oil is supplied only through the auxiliary pipe to the mold clamping cylinder having reached the predetermined mold clamping value.

8. The mold clamping apparatus according to claim 2, wherein the flow analysis is performed on a resin injected into the mold block.

9. A mold clamping apparatus comprising:
a stationary die plate that holds a stationary mold;
a movable die plate that holds a movable mold;
a die plate moving means that moves the movable die plate toward and away from the stationary die plate; and
a mold clamping means that connects and pressurizes the stationary die plate and the movable die plate,
wherein the mold clamping means includes a plurality of mold clamping cylinders provided on one of the stationary die plate and the movable die plate,
a plurality of tie bars each having one end connected to a ram of the mold clamping cylinder, and the other end having a plurality of ring grooves or screw grooves at regular pitches,
a half nut provided on the other of the stationary die plate and the movable die plate and engageable with the plurality of ring grooves or screw grooves,
a hydraulic pipe communicating with each of the plurality of mold clamping cylinders, said hydraulic pipe comprising a common pipe and an auxiliary pipe, the auxiliary pipe communicating directly with each of the plurality of mold clamping cylinders,
a plurality of a hydraulic sources each including a hydraulic pump that supplies oil to the hydraulic pipe, and corresponding to the plurality of mold clamping cylinders, and
a control device that controls the supply of the oil from the hydraulic source to the hydraulic pipe,
the control device is configured to supply the oil discharged from all the hydraulic sources to each of the mold clamping cylinders through a common pipe at the beginning of pressure increase in supplying the oil to each of the mold clamping cylinders, and
the control device is configured such that at a time when each predetermined mold clamping hydraulic value corresponding to each mold clamping cylinder is reached in a pressure increasing process, the supply of the oil from the hydraulic source through the common pipe to the mold clamping cylinder is stopped, and the oil is supplied through the auxiliary pipe to the mold clamping cylinder having reached the predetermined mold clamping value.

* * * * *